US008670023B2

(12) United States Patent
Hu et al.

(10) Patent No.: US 8,670,023 B2
(45) Date of Patent: Mar. 11, 2014

(54) APPARATUSES AND METHODS FOR PROVIDING A 3D MAN-MACHINE INTERFACE (MMI)

(75) Inventors: Yueh-Wei Hu, Taipei (TW); Cheng-Che Chen, Banqiao (TW); Ting Chiou, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 483 days.

(21) Appl. No.: 13/007,791

(22) Filed: Jan. 17, 2011

(65) Prior Publication Data

US 2012/0182396 A1 Jul. 19, 2012

(51) Int. Cl.
*H04N 13/02* (2006.01)

(52) U.S. Cl.
USPC .......... 348/47; 348/48; 348/49; 348/50; 348/51; 348/52; 348/53; 348/54; 348/55; 348/56; 348/57; 348/58; 348/59; 348/60; 348/77; 704/3; 704/9

(58) Field of Classification Search
USPC .......................................................... 348/47
See application file for complete search history.

(56) References Cited

U.S. PATENT DOCUMENTS

| | | | | |
|---|---|---|---|---|
| 4,375,674 A * | 3/1983 | Thornton | | 702/41 |
| 6,278,702 B1 * | 8/2001 | Deane et al. | | 370/342 |
| 7,006,881 B1 * | 2/2006 | Hoffberg et al. | | 700/83 |
| 2004/0004646 A1 * | 1/2004 | Jung et al. | | 347/43 |
| 2005/0039176 A1 * | 2/2005 | Fournie | | 717/156 |
| 2007/0098250 A1 * | 5/2007 | Molgaard et al. | | 382/154 |
| 2007/0168413 A1 * | 7/2007 | Barletta et al. | | 709/203 |
| 2007/0237404 A1 * | 10/2007 | Strom | | 382/232 |
| 2008/0062257 A1 | 3/2008 | Corson | | |
| 2008/0198159 A1 * | 8/2008 | Liu et al. | | 345/420 |
| 2009/0111511 A1 * | 4/2009 | Bengtsson | | 455/556.1 |
| 2009/0183125 A1 | 7/2009 | Magal et al. | | |

* cited by examiner

*Primary Examiner* — Mehrdad Dastouri
*Assistant Examiner* — Shan Elahi
(74) *Attorney, Agent, or Firm* — McClure, Qualey & Rodack, LLP

(57) ABSTRACT

An electronic interaction apparatus for providing a 3D MMI is provided with a processing unit. The processing unit determines a first length between an object positioned at a first time and a surface formed by two digital camera modules, and a second length between the object positioned at a second time and the surface. Also, the processing unit determines a third length between the object positioned at a third time and the surface, and determines a depth in a virtual 3D space corresponding to the object positioned at the third time according to the first length, the second length, and the third length. Particularly, the virtual 3D space is displayed in a display screen, the third time is later than the first time and the second time, and the third length is longer than the first length and shorter than the second length.

18 Claims, 6 Drawing Sheets

APPARATUSES AND METHODS FOR PROVIDING A 3D MAN-MACHINE INTERFACE (MMI)

BACKGROUND OF THE INVENTION

1. Field of the Invention

The invention generally relates to man-machine interface (MMI), and more particularly, to apparatuses and methods for providing a three-dimensional (3D) MMI with gesture calibrations for different users.

2. Description of the Related Art

To an increasing extent, display screens are being used for electronic devices, such as computers, mobile phones, media player devices, and gaming devices, etc., as an MMI. The MMI may be a graphical interface displayed on display screens and users may interact with the electronic devices via certain hardware input units coupled thereto or therein, such as keypads, keyboards, or a mouse, etc. Alternatively, there may be sensors integrated with or placed on the display screen for detecting the contact points of objects on the display screen, so that users may interact with the electronic devices by using pointers, styluses, or their fingers, etc., to touch or approximate the display screens.

However, the MMIs employed with either hardware input units or touch sensors are provided as a two-dimensional (2D) operation interfaces. The disadvantage of the design is that it limits certain functions for interacting with the electronic devices, for example, only a limited number of icons or UI controls can be placed in a flat surface. Since more and more applications are requiring 3D user operations, it is therefore desired to provide a 3D MMI which is convenient and flexible for different gestures of users.

BRIEF SUMMARY OF THE INVENTION

Accordingly, embodiments of the invention provide apparatuses and methods for providing a 3D MMI. In one aspect of the invention, an electronic interaction apparatus comprising a processing unit is provided. The processing unit determines a first length between an object positioned at a first time and a surface formed by two digital camera modules, and determines a second length between the object positioned at a second time and the surface. Also, the processing unit determines a third length between the object positioned at a third time and the surface, wherein the third time is later than the first time and the second time, and the third length is larger than the first length and smaller than the second length. According to the first length, the second length, and the third length, the processing unit further determines a depth in a virtual 3D space corresponding to the object positioned at the third time, wherein the virtual 3D space is displayed in a display screen.

In another aspect of the invention, a method for providing a 3D MMI is provided. The method comprises the steps of determining a first length between an object positioned at a first time and a surface formed by two digital camera modules, determining a second length between the object positioned at a second time and the surface, determining a third length between the object positioned at a third time and the surface, wherein the third time is later than the first time and the second time, and the third length is longer than the first length and shorter than the second length, and determining a depth in a virtual 3D space corresponding to the object positioned at the third time according to the first length, the second length, and the third length.

Other aspects and features of the present invention will become apparent to those with ordinarily skill in the art upon review of the following descriptions of specific embodiments of the apparatus and methods for providing a 3D MMI.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Figure 1:
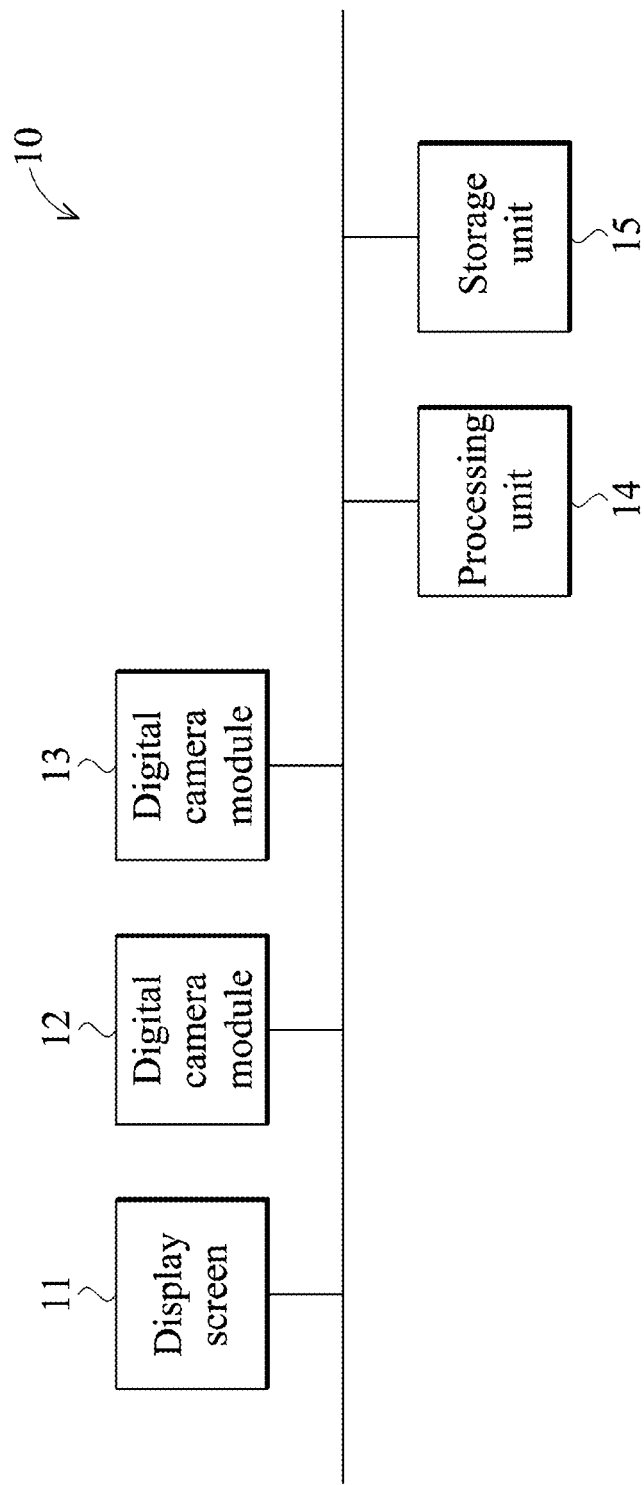
FIG. 1 shows a block diagram of an electronic interaction apparatus according to an embodiment of the invention.

FIG. 1 shows a block diagram of an electronic interaction apparatus according to an embodiment of the invention. The electronic interaction apparatus 10 is equipped with a display screen 11 and two digital cameras 12 and 13 as part of a 3D man-machine interface (MMI). The 3D MMI is the means by which the user interacts with the electronic interaction apparatus 10. Specifically, the 3D MMI may contain screen menus, icons, text messages, objects, etc., on the display screen 11, and the digital camera modules 12 and 13 are used to capture images of gestures of a user. The digital camera module 12 or 13 is implemented to capture an object in front thereof, and may include camera lens, an image sensor chip, a front end signal processor, an image signal processor, and a frame buffer. The digital camera module 12 or 13 records color images through the camera lens as intensities of red, green and blue light, which are stored as variable charges on the image sensor chip such as a complementary metal-oxide semiconductor (CMOS) or a charge-coupled device (CCD) image sensor chip. The charges, which are actually analog, are converted to digital signals by the front end signal processor. The image signal processor may generate an original Bayer pattern image based on the converted digital signals. Each pixel of a Bayer pattern contains information that is relative to only one color component, such as G, B or R. A color interpolation unit installed in the image signal processor may interpolate the Bayer pattern image to get a complete color image, RGB bitmap image. The RGB bitmap image may record an object such as a hand, a pen or others. Each pixel of the resulting RGB bitmap image contains information that is relative to three color components, such as G, B and R. The RGB bitmap image may be further processed by a gamma correction unit installed in the image signal processor to perform a gamma correction process therewith and to generate a corrected RGB bitmap image, which may further be transformed into an YCbCr bitmap image by an RGB to YCbCr transform unit installed in the image signal processor. The RGB or YCbCr bitmap images may be stored in the frame buffer for subsequent analysis. Note that in some embodiments, only R or Y components of each RGB or YCbCr bitmap image are stored to increase performance analysis and reduce storage capacity. A processing unit 14 of the electronic interaction apparatus 10, such as a general-purposed processor or a micro-control unit (MCU), or others, loads and executes a series of program codes from a storage unit 15, such as a memory, a hard disk, or others, to provide users with 3D MMI functions. The electronic interaction apparatus 10 may be a mobile phone, a TV, a monitor of a desktop computer or a workstation, a laptop, a portable media player (PMP), a portable gaming console, a global positioning system (GPS) navigation device, and so on.

Figure 2:
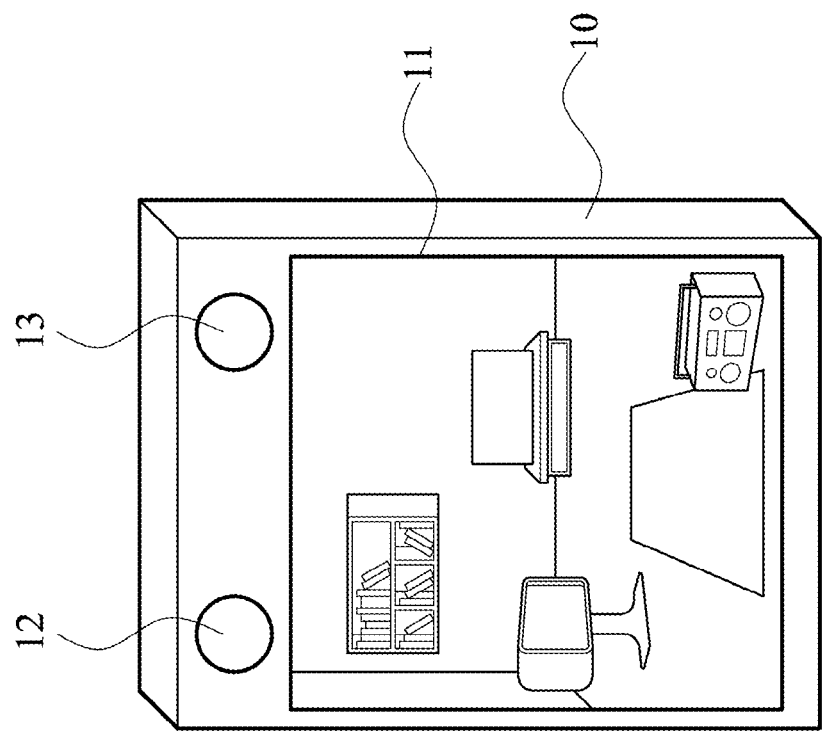
FIG. 2 is a schematic diagram illustrating an exemplary elevated view of the electronic interaction apparatus 10 according to an embodiment of the invention.
Figure 3:
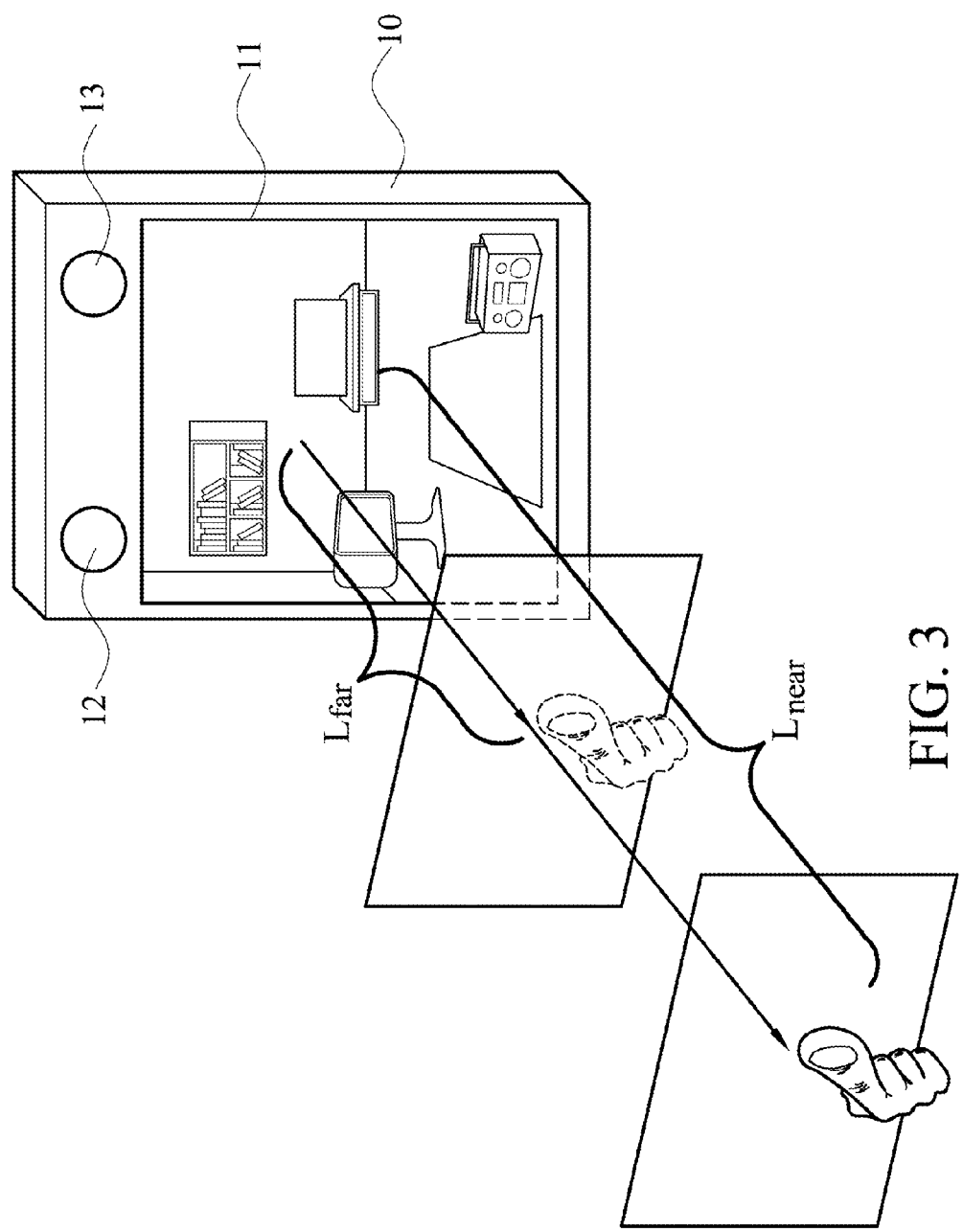
FIG. 3 is a schematic diagram illustrating an exemplary calibration of user gestures to fit the virtual 3D room displayed on the display screen 11.

To further clarify, the display screen 11 provides a visual presentation of a virtual 3D space generated by an MMI control module, and the digital camera modules 12 and 13 are disposed to form a surface, wherein the images of the gestures of a user captured by the digital camera modules 12 and 13 may be used to determine a distance from gestures of a user to the surface. According to the determined distance, the gestures of a user may be further mapped to a specific position in the virtual 3D space. However, different users may have different gesture traits. For example, the moving range of the gestures may vary since a taller user generally has a longer arm length than a shorter user. In order to adapt the 3D MMI to the gesture traits of a user, a calibration procedure is first performed at the start of the MMI control module. The MMI control module may be a firmware or a software module, or the combination, being executed by the processing unit 14 and cooperating with the digital camera modules 12 and 13. FIG. 2 is a schematic diagram illustrating an exemplary elevated view of the electronic interaction apparatus 10 according to an embodiment of the invention. As shown in FIG. 2, the display screen 11 displays a virtual 3D room in which a plurality of objects, such as a radio, a TV, and a bookshelf, are placed, and the surface formed by the disposal of the digital camera modules 12 and 13 conforms to the surface of the display screen 11. To calibrate the gesture traits of a user to fit the virtual 3D room, a preferred depth of gestures of a user is determined to map to the depth of the virtual 3D room, so that a relationship between the depth of user gestures and the depth of the virtual 3D room is obtained. FIG. 3 is a schematic diagram illustrating an exemplary calibration of user gestures to fit the virtual 3D room displayed on the display screen 11. Firstly, at time $t_1$ during the calibration procedure, the processing unit 14 may configure the display screen 11 to prompt an indication, informing an user to virtually place his/her hand to point to a displayed object corresponding to the farthest end of the virtual 3D room, and then the processing unit 14 determines the length $L_{far}$ between the hand and the surface of the display screen 11. For example, an arrow pointing to the bookshelf embedded in the back wall may be displayed to prompt the user to virtually touch the bookshelf. It is noted that the virtual pointing is not required to touch or approximate the display screen 11. Secondly, at time $t_2$ during the calibration procedure, the processing unit 14 may configure the display screen 11 to prompt an indication, informing the user to place his/her hand to point to a displayed object corresponding to the nearest end of the virtual 3D room, and then the processing unit 14 determines the length $L_{near}$ between the hand and the surface of the display screen 11. For example, an arrow pointing to the radio on the ground may be displayed to prompt the user to virtually touch the radio. The preferred depth of user gestures may be determined as the interval between the length $L_{far}$ and the length $L_{near}$. It is to be understood that the user may further wear a finger cot in red, blue, green, or another color, to increase the precision of the length determinations. Alternatively, the user may use a light pen to participate the calibration procedure.

In regular manipulation to the 3D MMI after the calibration procedure, the processing unit 14 determines the length $L_{current}$ between a placed hand and the surface of the display screen 11 with reference to the calibrated lengths $L_{far}$ and the length $L_{near}$. With the length $L_{far}$, the length $L_{near}$, and the length $L_{current}$, a touching depth in the virtual 3D room corresponding to the currently placed hand may be determined according to the following equation:

$$\frac{L_{near} - L_{current}}{L_{near} - L_{far}} \times T \tag{1}$$

wherein T represents the total depth of the virtual 3D room.

Figure 4:
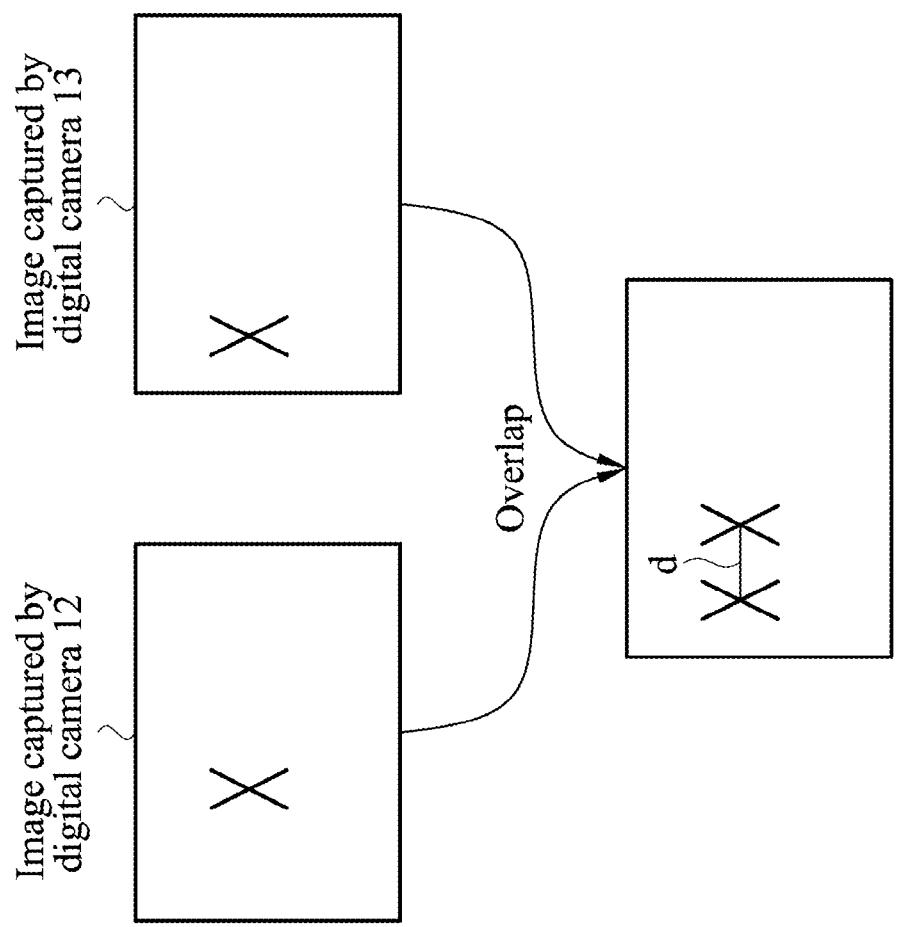
FIG. 4 shows an exemplary diagram illustrating the difference between the positions of an object in the images captured by the digital cameras 12 and 13.
Figure 5:
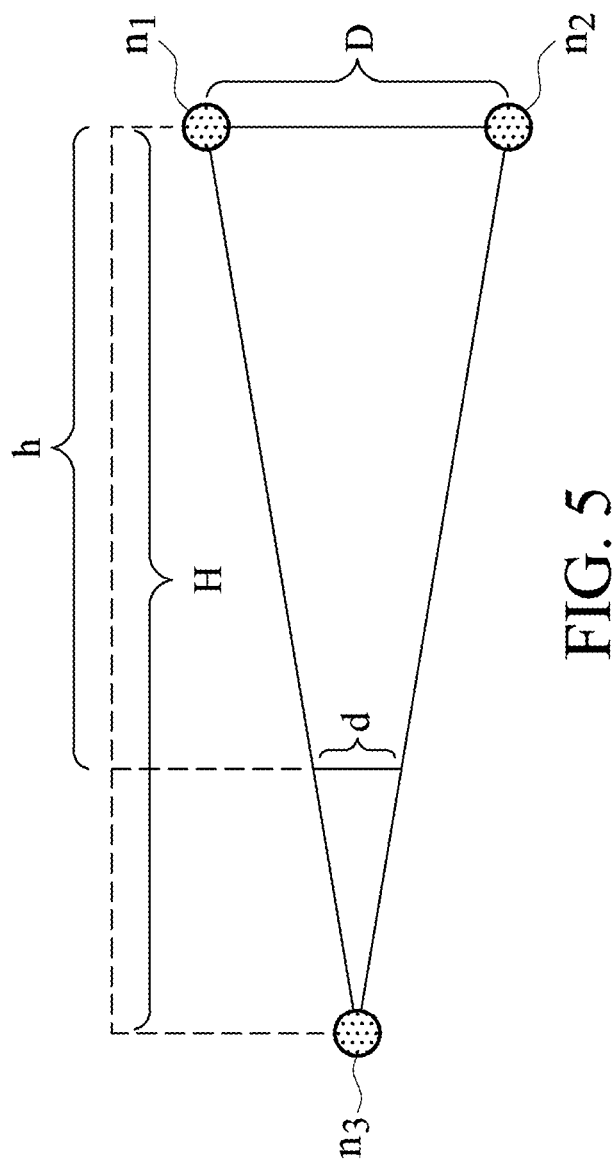
FIG. 5 shows an exemplary diagram of a triangle established in the stereo depth calculation according to an embodiment of the invention.

During the determinations of the lengths $L_{far}$, $L_{near}$, and $L_{current}$, the digital camera modules 12 and 13 requires to capture images in front of the display screen 11. Due to the digital camera modules 12 and 13 are disposed in different positions with a substantial distance D, the position of the object in an image captured by the digital camera 12, such as a hand, a finger, or a light pen, may be different from the position of the object in the other image captured by the digital camera 13. By overlapping the two images, the difference d between the positions of the object is determined, as shown in FIG. 4. Thus, the length $L_{far}$, $L_{near}$, or $L_{current}$ may be determined according to the distance D and the difference d. In one embodiment, the length $L_{far}$, $L_{near}$, or $L_{current}$ may be determined using the stereo depth calculation in which a triangle is established to determine the length between the object and the surface of the display screen 11 with reference to the parameters D and d. FIG. 5 shows an exemplary diagram of a triangle established in the stereo depth calculation according to an embodiment of the invention. The triangle consists of three nodes $n_1$ to $n_3$, wherein the nodes $n_1$ and $n_2$ correspond to the positions of the digital camera modules 12 and 13. When a subject placed at the node $n_3$ and captured by the digital camera modules 12 and 13, the positions of the subject in two captured images are substantially the same. Note that the distance H between the node $n_3$ and the surface of the display screen 11 is a constant predetermined or known during the manufacturing and fabrication processes of the electronic interaction apparatus 10. With the distance H, the distance D, and the difference d, the length between the object and the surface of the display screen 11 may be determined by employing the following normalized cross correlation technique:

$$\left(1 - \frac{d}{D}\right) \times H \tag{2}$$

In another embodiment, the length $L_{far}$, $L_{near}$, or $L_{current}$ may be determined in terms of a lookup table storing mapping information between a plurality of predetermined lengths $L_p$ from the surface of the display screen 11, and a plurality of differences $d_c$ between the positions of an subject in two images captured by the digital camera modules 12 and 13.

The mappings are predetermined during the manufacturing and fabrication processes of the electronic interaction apparatus 10. An exemplary lookup table is given below in Table 1:

TABLE 1

| Predetermined length $L_p$ (pixel) | Corresponding difference $d_c$ (pixel) |
|---|---|
| 50 | 10 |
| 60 | 12 |
| 80 | 14 |
| . | . |
| . | . |
| . | . |

Specifically, the processing unit 14 first determines the differences between the positions of the object in two images captured by the digital camera modules 12 and 13 at time $t_1$, $t_2$, or $t_3$, searches the lookup table for a match for the determined object position difference, and obtains the length $L_{far}$, $L_{near}$, or $L_{current}$ in accordance with the match. If no match is found in the lookup table, the processing unit 14 locates two stored differences d' and d" in which the determined difference falls between, finds out their corresponding predetermined lengths L' and L", and calculates the length between the object and the surface of the display screen 11 using the following equal proportional correlation technique:

$$\left(\frac{d-d'}{d''-d'}\right) \times (L''-L') + L' \quad (3)$$

For example, if a determined difference between the positions of the object in two images captured by the digital cameras 12 and 13 at a given time is 11 pixels, the length between the object and the surface of the display screen 11 may be determined to be $$\left(\frac{11-10}{12-10}\right) \times (60-50) + 50$$

pixels. It is to be understood that the unit for measuring the difference between the positions of the object in two images captured by the digital cameras 12 and 13, and length between the object and the surface of the display screen 11 may alternatively be in inches, centimeters, millimeters, or others, and the invention is not limited thereto.

In yet another embodiment, the invention provides an alternative to determine the length $L_{far}$, $L_{near}$, or $L_{current}$ using a combination of the lookup table and the stereo depth calculation. The processing unit 14 first determines the difference d between the positions of the object in two images captured by the digital cameras 12 and 13 at time $t_1$, $t_2$, or $t_3$, and then searches for a match for the difference in the lookup table to obtain the lengths $L_{far}$, $L_{near}$, or $L_{current}$. If no match is found in the lookup table, instead of using the equal proportional correlation technique, the processing unit 14 uses the stereo depth calculation to determine the length $L_{far}$, $L_{near}$, or $L_{current}$. Specifically, the processing unit 14 first locates one stored difference d' which is closest to the difference d being present between the two images, and, referring to FIG. 5, uses the stored difference d' and its corresponding predetermined length L' to reestablish the triangle in which the distance H between the node $n_3$ and the surface of the display screen 11 is recalculated according to the following equation:

$$H = \frac{D}{d'} \times L' \quad (4)$$

Subsequently, the processing unit 14 further uses the recalculated distance H and the determined difference d to derive the length between the object and the surface of the display screen 11 according to the equation (2).

Figure 6:
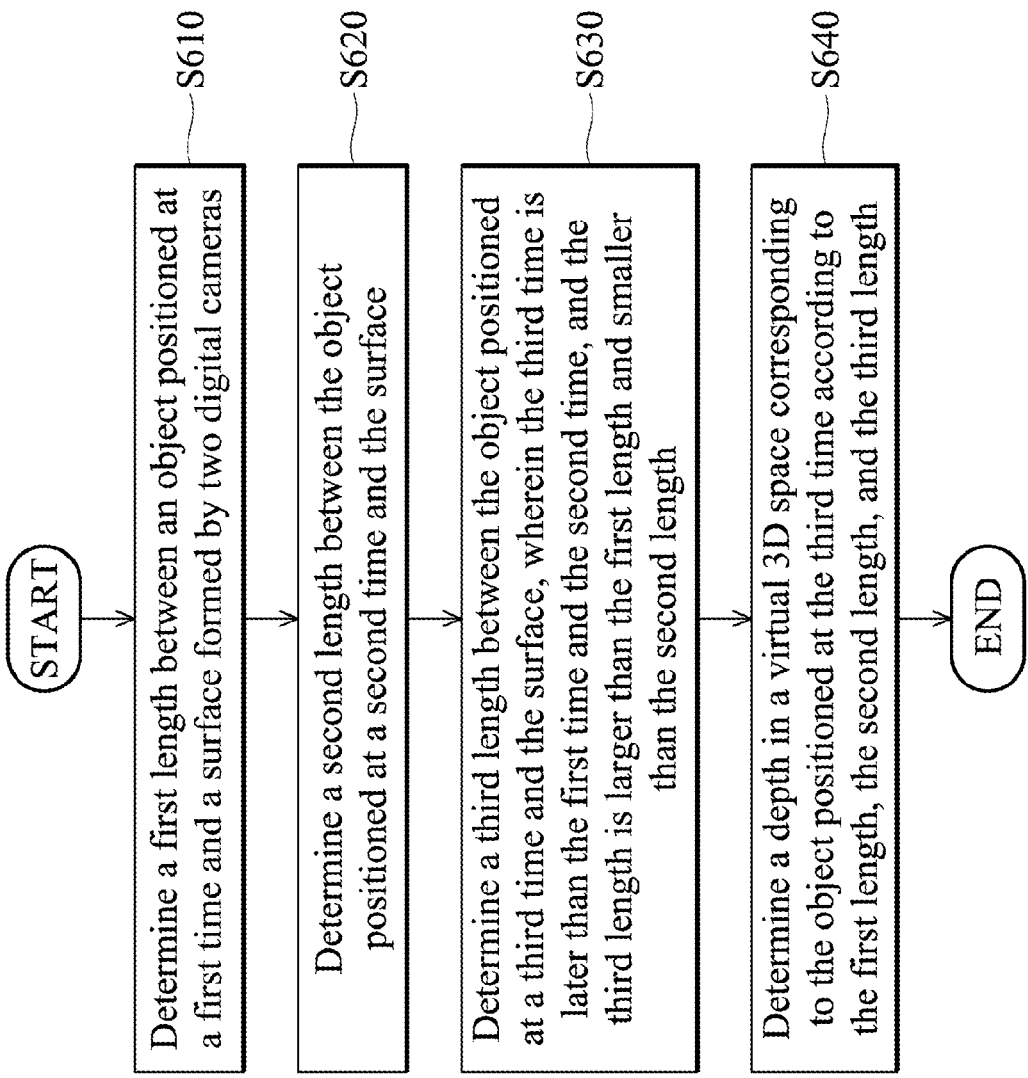
FIG. 6 shows a flow chart of the method for providing a 3D MMI according to an embodiment of the invention.

FIG. 6 shows a flow chart of the method for providing a 3D MMI according to an embodiment of the invention. The method may be applied in an electronic interaction apparatus equipped with a display screen and at least two digital cameras, such as a mobile phone, an TV, a monitor of a desktop computer or a workstation, a laptop, a PMP, a portable gaming console, a GPS navigation device, and so on. Take the electronic interaction apparatus 10 as an example. When the electronic interaction apparatus 10 is started up, a series of initialization processes, including booting up of the operating system, initializing of a 3D MMI, and activating of the embedded or coupled functional modules (such as the display screen 11 and the digital camera modules 12 and 13), etc., are performed. After the initialization processes are finished, an MMI control module for users may be executed. Before execution of the selected application or widget, a virtual 3D space provided by the MMI control module is displayed on the display screen 11 and the method for providing a 3D MMI is applied. To begin the method, a calibration procedure is performed, the processing unit 14 determines a first length between an object positioned at a first time and the surface formed by the digital cameras 12 and 13 (step S610), and determines a second length between the object positioned at a second time and the surface (step S620). Specifically, the first length and the second length may represent a calibrated depth for user gestures, which correspond to the nearest end and the farthest end of the virtual 3D space, respectively, so that the relationship between the placed positions of the user gestures and the depth of the virtual 3D space is obtained. In addition, the processing unit 14 may further display a first indication and a second indication in the virtual 3D space to indicate objects closet to the farthest end and the nearest end of the virtual 3D space, prior to determining the first length and the second length. Subsequently, during normal manipulation, the processing unit 14 determines a third length between the object positioned at a third time and the surface, wherein the third time is later than the first time and the second time, and the third length is longer than the first length and shorter than the second length (step S630).

Regarding the determinations of the first length, the second length, and the third length in the steps S610 to S630, the digital cameras 12 and 13 are required to capture images in front of the surface of the display screen 11 at the first time, the second time, and the third time, respectively, to determine the differences between the positions of the object in the images captured by the digital cameras 12 and 13 at the first time, the second time, and the third time, respectively. In one embodiment, the stereo depth calculation may be used to determine any of the first to the third lengths as described above with respect to FIG. 5. In another embodiment, a lookup table may be used to find out any of the first to the third lengths with the determined difference, wherein the lookup table stores a plurality of predetermined lengths between the object and the surface of the display screen 11, and a plurality of corresponding differences between the positions of the object in the images captured by the digital cameras 12 and 13. Alternatively, a combination of the lookup table and the stereo depth calculation may be used to determine any of the first to the third lengths as described above with respect to the equation (4).

According to the first to the third lengths, the processing unit 14 calculates a depth in the virtual 3D space corresponding to the object positioned at the third time (step S640). Specifically, the depth in the virtual 3D space is calculated according to the equation (1). Similarly, the processing unit 14 may further display a third indication at the calculated depth or a particular object at the calculated depth in the virtual 3D space to prompt the user which position is located or which object is pointed.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An electronic interaction apparatus for providing a 3D man-machine interface (MMI), comprising:
    a processing device, determining a first length between an object positioned at a first time and a surface formed by two digital camera devices, determining a second length between the object positioned at a second time and the surface, determining a third length between the object positioned at a third time and the surface, and determining a depth in a virtual 3D space corresponding to the object positioned at the third time according to the first length, the second length, and the third length,
    wherein the virtual 3D space is displayed in a display screen, the third time is later than the first time and the second time, and the third length is longer than the first length and shorter than the second length,
    wherein the processing device determines the depth in the virtual 3D space using the following formula:

$$\frac{L_{near} - L_{current}}{L_{near} - L_{far}} \times T,$$

where $L_{far}$ is the first length, $L_{near}$ is the second length, $L_{current}$ is the third length, and T represents the total depth of the virtual 3D space.

2. The electronic interaction apparatus of claim 1, wherein the two digital camera devices are disposed to be at a first distance from each other, and the processing device further obtains two images of the object at each of the first time, the second time, and the third time via the two digital camera devices.

3. The electronic interaction apparatus of claim 2, wherein the object in one of the images captured at the first, second or third time is positioned at a second distance from the object in the other one of the images, and the processing device further determines the first length, the second length or the third length according to the first distance and the corresponding second distance.

4. The electronic interaction apparatus of claim 3, wherein the processing device further determines the first, second or third length using the following formula:

$$\left(1 - \frac{d}{D}\right) \times H,$$

where D is the first distance, d is the corresponding second distance, and H is a constant distance from the surface, and, if a subject is placed at a node for H distance from the surface and captured by the two camera devices, the positions of the subject in two captured images are substantially the same.

5. The electronic interaction apparatus of claim 2, wherein the processing device further determines the first length, the second length, or the third length according to a predetermined lookup table storing mapping information between a plurality of predetermined lengths from the surface, and a plurality of differences between the positions of an subject in two images captured by the two digital camera devices.

6. The electronic interaction apparatus of claim 5, wherein the processing device further searches the lookup table for a match for the corresponding second distance and obtains the first, second or third length in accordance with the match.

7. The electronic interaction apparatus of claim 1, wherein the first length and the second length correspond to a farthest end and a nearest end of the virtual 3D space, respectively.

8. The electronic interaction apparatus of claim 7, wherein processing device further configures the display screen to display a first indication and a second indication in the virtual 3D space, informing user to place the object to point to the farthest end and the nearest end of the virtual 3D space, respectively.

9. The electronic interaction apparatus of claim 1, wherein the first and second times are during a calibration procedure, and the third time is during regular manipulation.

10. A method for providing a 3D man-machine interface (MMI), comprising:
    determining a first length between an object positioned at a first time and a surface formed by two digital camera devices;
    determining a second length between the object positioned at a second time and the surface;
    determining a third length between the object positioned at a third time and the surface, wherein the third time is later than the first time and the second time, and the third length is longer than the first length and shorter than the second length; and
    determining a depth in a virtual 3D space corresponding to the object positioned at the third time according to the first length, the second length, and the third length,
    wherein the determination step for the depth further comprising determines the depth in the virtual 3D space using the following formula:

$$\frac{L_{near} - L_{current}}{L_{near} - L_{far}} \times T,$$

where $L_{far}$ is the first length, $L_{near}$ is the second length, $L_{current}$ is the third length, and T represents the total depth of the virtual 3D space.

11. The method of claim 10, wherein the two digital camera modules are disposed to be at a first distance from each other, and each determination step for the first, second and third lengths further comprises capturing two images of the object at the first time, the second time, or the third time by the two digital camera modules.

12. The method of claim 11, wherein the object in one of the images captured at the first, second or third time is positioned at a second distance from the object in the other one of the images, and each determination step for the first, second and third lengths further comprises determining the first, second or third length according to the first distance and the corresponding second distance.

13. The method of claim 12, wherein the determination step for the first, second or third length further comprises using the following formula to determine the first, second or third length, $$\left(1 - \frac{d}{D}\right) \times H,$$

where D is the first distance, d is the corresponding second distance, and H is a constant distance from surface, and, if a subject is placed at a node for H distance from the surface and captured by the two camera devices, the positions of the subject in two captured images are substantially the same.

14. The method of claim 11, wherein the determination step for the first, second or third length further comprises determining the first length, the second length, or the third length according to a predetermined lookup table storing mapping information between a plurality of predetermined lengths from the surface, and a plurality of differences between the positions of an subject in two images captured by the two digital camera devices.

15. The method of claim 14, wherein determination step for the first, second or third length further comprises:
    searching the lookup table for a match for the corresponding second distance; and
    obtaining the first, second or third length in accordance with the match.

16. The method of claim 10, wherein the first length and the second length correspond to a farthest end and a nearest end of the virtual 3D space, respectively.

17. The method of claim 16, wherein the determining step for the first length further comprising displaying a first indication in the virtual 3D space, informing user to place the object to point to the farthest end of the virtual 3D space, and the determination step for the second length further comprising displaying a second indication in the virtual 3D space, informing user to place the object to point to the nearest end of the virtual 3D space.

18. The method of claim 10, wherein the determination steps for the first and second lengths are during a calibration procedure, and the determination step for the third length is during regular manipulation.

* * * * *